US008930365B2

(12) United States Patent
Chakrabarti et al.

(10) Patent No.: US 8,930,365 B2
(45) Date of Patent: *Jan. 6, 2015

(54) SYSTEM AND METHOD FOR EVOLUTIONARY CLUSTERING OF SEQUENTIAL DATA SETS

(75) Inventors: Deepayan Chakrabarti, Mountain View, CA (US); Shanmugasundaram Ravikumar, Cupertino, CA (US); Andrew Tomkins, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1352 days.

This patent is subject to a terminal disclaimer.

(21) Appl. No.: 11/414,448

(22) Filed: Apr. 29, 2006

(65) Prior Publication Data

US 2007/0255737 A1 Nov. 1, 2007

(51) Int. Cl.
*G06F 7/00* (2006.01)
*G06F 17/30* (2006.01)
*G06K 9/62* (2006.01)

(52) U.S. Cl.
CPC ........ *G06F 17/30705* (2013.01); *G06K 9/6218* (2013.01)
USPC ...................................................... 707/737

(58) Field of Classification Search
CPC .......... G06F 17/30598; G06F 17/3071; G06F 17/30705
USPC ...................................................... 707/737
See application file for complete search history.

(56) References Cited

U.S. PATENT DOCUMENTS

| | | | |
|---|---|---|---|
| 5,983,224 A * | 11/1999 | Singh et al. ........................ 707/6 |
| 6,115,357 A * | 9/2000 | Packer et al. .................. 370/231 |
| 6,269,376 B1 * | 7/2001 | Dhillon et al. ................. 707/101 |
| 7,003,509 B2 | 2/2006 | Andreev | |
| 2002/0052692 A1 * | 5/2002 | Fahy ................................ 702/19 |
| 2002/0054694 A1 * | 5/2002 | Vachtsevanos et al. ....... 382/111 |
| 2002/0183966 A1 * | 12/2002 | Mishra et al. .................. 702/179 |
| 2002/0192686 A1 * | 12/2002 | Adorjan et al. .................... 435/6 |
| 2003/0149679 A1 * | 8/2003 | Na et al. ............................ 707/1 |
| 2003/0176931 A1 * | 9/2003 | Pednault et al. ................. 700/31 |
| 2003/0208485 A1 * | 11/2003 | Castellanos ........................ 707/5 |
| 2004/0111708 A1 * | 6/2004 | Calder et al. ................... 717/131 |
| 2004/0220963 A1 * | 11/2004 | Chen et al. ................ 707/103 R |
| 2005/0120105 A1 * | 6/2005 | Popescu et al. ............... 709/223 |
| 2006/0085188 A1 | 4/2006 | Goodwin et al. | |
| 2006/0287848 A1 * | 12/2006 | Li et al. ............................. 704/9 |

OTHER PUBLICATIONS

Aggarwal et al., A Framework for Clustering Evolving Data Streams, 2003, Proceedings of the VLDB Conference 2003.*

(Continued)

*Primary Examiner* — Cheryl Lewis
*Assistant Examiner* — Huen Wong
(74) *Attorney, Agent, or Firm* — Buchenhorner Patent Law

(57) ABSTRACT

An improved system and method for evolutionary clustering of sequential data sets is provided. A snapshot cost may be determined for representing the data set for a particular clustering method used and may determine the cost of clustering the data set independently of a series of clusterings of the data sets in the sequence. A history cost may also be determined for measuring the distance between corresponding clusters of the data set and the previous data set in the sequence of data sets to determine a cost of clustering the data set as part of a series of clusterings of the data sets in the sequence. An overall cost may be determined for clustering the data set by minimizing the combination of the snapshot cost and the history cost. Any clustering method may be used, including flat clustering and hierarchical clustering.

15 Claims, 7 Drawing Sheets

(56) References Cited

OTHER PUBLICATIONS

Aggarwal et al., Online Analysis of Community Evolution in Data Streams, 2005, Proceedings of the ACM SIAM on Data Mining, 2005.*

Moore, K-means and Hierarchical Clustering, Nov. 16, 2001, Carnegie Mellon University School of Computer Science.*

Fisher, "Knowledge Acquisition Via Incremental Conceptual Clustering", Sep. 1987, Machining Learning, vol. 2, No. 2, pp. 139-172.*

Fisher et al., "Applying AI Clustering to Engineering Tasks", IEEE Expert, Dec. 1993, pp. 51-60.*

Jain et al., "Data Clustering: A review", Sep. 1999, ACM computing Surveys, vol. 31, No. 3, pp. 264-323.*

Chakrabarti et al., "Evolutionary Clustering", KDD 2006, Aug. 2006.*

Leung et al., Representing and Recognizing the Visual Appearance of Materials using Three-dimensional Textons, Feb. 23, 2001, University of California at Berkley.*

Hush et al., "Progress in Supervised Neural Networks", Jan. 1993, IEEE Signal Processing Magazine.*

Leung et al., "Representing and Recognizing the Visual Appearance of Materials using Three-dimensional Textons", 2001, Kluwer Academic Publishers.*

Douglas H. Fisher, "Knowledge Acquisition Via Incremental Conceptual Clustering", Machining Learning, vol. 2, No. 2, p. 139-172, Sep. 1987.

Sepandar D. Kamvar et al., "Interpreting and Extending Classical Agglomerative Clustering Algorithms Using a Model-Based Approach," in Proceedings of $9^{th}$ International Conference on Machine Learning, p. 283-290, 2002.

Doug Fisher et al., "Applying AI Clustering to Engineering Tasks," IEEE Expert, Dec. 1993, p. 51-60.

Charu C. Aggarwal et al., "A Framework for Clustering Evolving Data Streams," Proceedings of the $29^{th}$ VLDB Conference, 2003.

A. K. Jain et al., "Data Clustering: A Review," ACM Computing Surveys, vol. 31, No. 3, Sep. 1999, p. 264-323.

Deepayan Chakrabarti et al., "Evolutionary Clustering," KDD 2006, Aug. 2006.

* cited by examiner

SYSTEM AND METHOD FOR EVOLUTIONARY CLUSTERING OF SEQUENTIAL DATA SETS

CROSS-REFERENCE TO RELATED APPLICATIONS

The present invention is related to the following United States patent applications, filed concurrently herewith and incorporated herein in their entireties:

"System and Method Using Flat Clustering for Evolutionary Clustering of Sequential Data Sets," U.S. patent application Ser. No. 11/414,460; and "System and Method Using Hierarchical Clustering for Evolutionary Clustering of Sequential Data Sets," U.S. patent application Ser. No. 11/414,442.

FIELD OF THE INVENTION

The invention relates generally to computer systems, and more particularly to an improved system and method for evolutionary clustering of sequential data sets.

BACKGROUND OF THE INVENTION

Typical software applications that may apply clustering techniques usually cluster static data sets. Many software applications today may also cluster a large static data set at one point in time and then may later cluster a changed representation of the large static data set. For example, the large data set may represent email membership of a large online network that may be clustered at the beginning of each month in a calendar year. Because the static data sets representative of the email membership may change from month to month, there may be shifts in cluster membership from month to month. As a result, static clustering techniques that may accurately identify monthly clusters of email membership may not identify and track annual clusters as accurately as those that model the email membership for the calendar year. Unfortunately, such static clustering algorithms may produce a poor clustering sequence over time.

What is needed is a way to consistently cluster a large data set over time while accurately clustering each data set collected at periodic intervals. Any such system and method should provide a generic framework that may support the use of various clustering methods.

SUMMARY OF THE INVENTION

Briefly, the present invention may provide a system and method for evolutionary clustering of sequential data sets. Evolutionary clustering of sequential data sets may be provided by a clustering server having an operably coupled clustering engine. The clustering engine may include a snapshot cost evaluator for determining a cost of clustering each data set in the sequence independent of the clusterings of the other data sets in the sequence. The clustering engine may also include a history cost evaluator for determining a cost of clustering the data set as part of a series of clusterings of the data sets in the sequence. The clustering engine may also include an overall cost evaluator for minimizing the combination of the snapshot cost of clustering the data set independently of the series of clusterings of the data sets in the sequence and the history cost of clustering the data set as part of the series of clusterings of the data sets in the sequence.

Advantageously any clustering method may be used to produce a series of evolutionary clusterings from a sequence of data sets. A snapshot cost may be determined for representing the data set for a particular clustering method used and may determine the cost of clustering the data set independently of a series of clusterings of the data sets in the sequence. A history cost may also be determined for measuring the distance between corresponding clusters of the data set and the previous data set in the sequence of data sets in order to determine a cost of clustering the data set as part of a series of clusterings of the data sets in the sequence. An overall cost may be determined for minimizing the combination of the snapshot cost of clustering the data set independently of the series of clusterings of the data sets in the sequence and the history cost of clustering the data set as part of the series of clusterings of the data sets in the sequence. Additionally, a greedy heuristic may be applied to minimize the distance between corresponding clusters of the data set and the previous data set in the sequence of data sets.

In various embodiments, a flat clustering engine may be provided for clustering the data set using a flat clustering of points, possibly in a vector space. For example, a k-means algorithm may be used in one embodiment to provide a flat clustering of points in a vector space. The snapshot cost for k-means may be determined to be the average distance from a point to its cluster center. The history cost for k-means may be determined to be the average distance from a cluster center to its closest equivalent in the previous clustering. The data set may then be clustered by minimizing the combination of the snapshot cost of using flat clustering to independently cluster the data set and the history cost of using flat clustering to cluster the data set as part of a sequence of clustered data sets.

In various other embodiments, a hierarchical clustering engine may be provided for clustering the data set using hierarchical clustering. For instance, a bottom-up agglomerative hierarchical clustering algorithm may be used in an embodiment to provide a hierarchical clustering. The snapshot cost of using agglomerative hierarchical clustering may be determined to be the average similarity encountered during a merge while creating a tree representing each cluster. The history cost of using agglomerative hierarchical clustering may be determined to be the sum of squared distances over all pairs of data points between a hierarchical clustering tree of the data set and a corresponding hierarchical clustering tree of the previous data set. The data set sequence may then be clustered by minimizing the combination of the snapshot cost of using hierarchical clustering to independently cluster the data set and the history cost of using hierarchical clustering to cluster the data set as part of a sequence of clustered data sets.

Other advantages will become apparent from the following detailed description when taken in conjunction with the drawings, in which:

DETAILED DESCRIPTION

Exemplary Operating Environment

Figure 1:
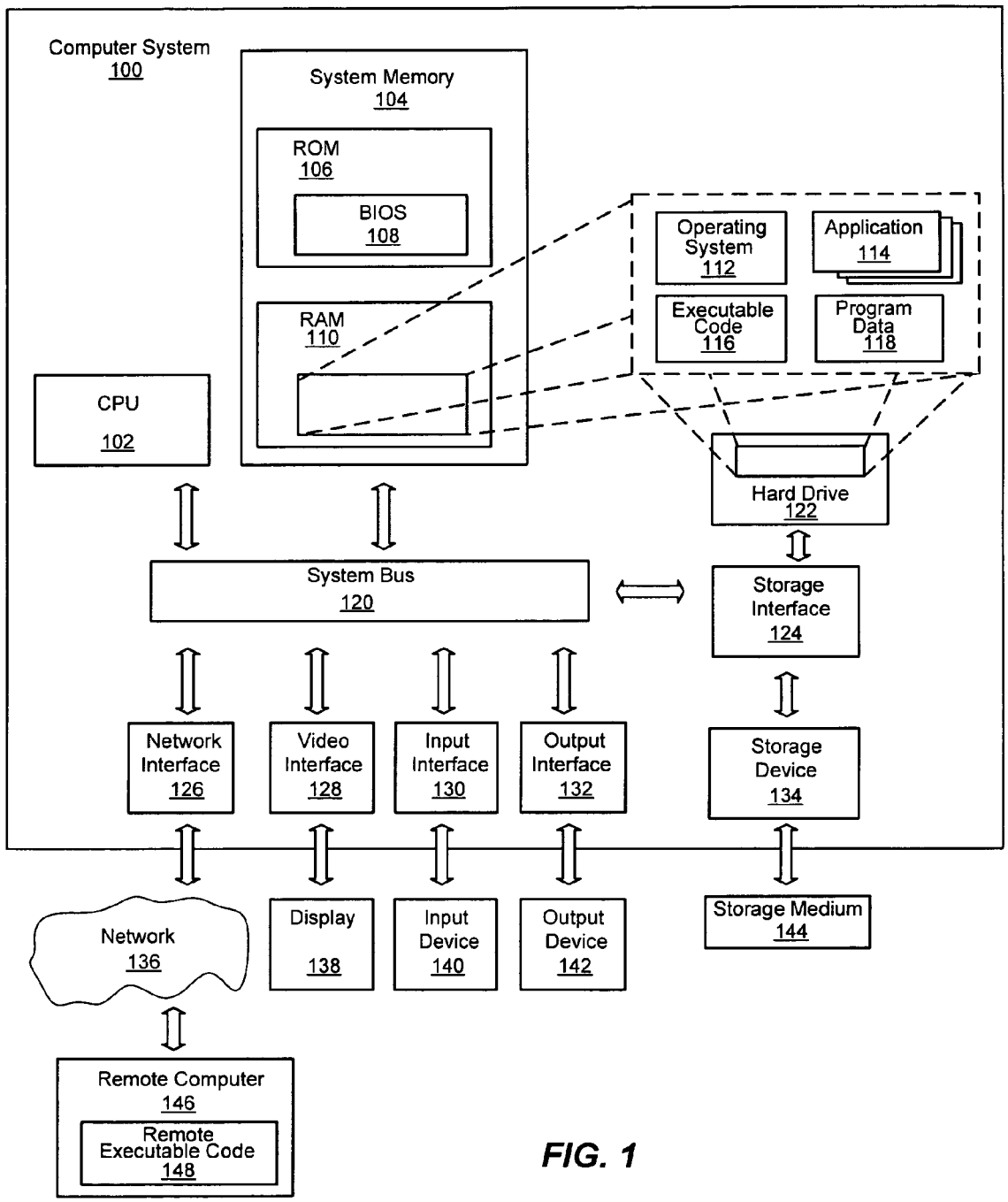
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may include computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, nonvolatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used.

Evolutionary Clustering of Sequential Data Sets

The present invention is generally directed towards a system and method for evolutionary clustering of sequential data sets. More particularly, the present invention provides a generic framework for performing evolutionary clustering of sequential data sets. In general, evolutionary clustering may mean herein to process timestamped data to produce a sequence of clusterings. As used herein, a data set may mean a collection of defined data acquired at a particular time. In an embodiment, a data set may be a periodic collection of defined data acquired within a particular time interval. In various embodiments, a data item in the data set may be timestamped. A sequential data set may mean herein a data set occurring in a series of data sets.

The framework described for performing evolutionary clustering of sequential data sets may optimize the clustering of a data set so that the clustering at any time may have high accuracy while also ensuring that the clustering does not change dramatically from one timestep to the next. To do so, a history cost of clustering a data set as part of a series of clusterings of data sets in the sequence may be combined with a snapshot cost of clustering the data set independently of the series of clustering. As will be seen, evolutionary clustering may be performed in one embodiment by performing flat clustering. In another embodiment, evolutionary clustering may be performed by using hierarchical clustering. As will be understood, the various block diagrams, flow charts and scenarios described herein are only examples, and there are many other scenarios to which the present invention will apply.

Figure 2:
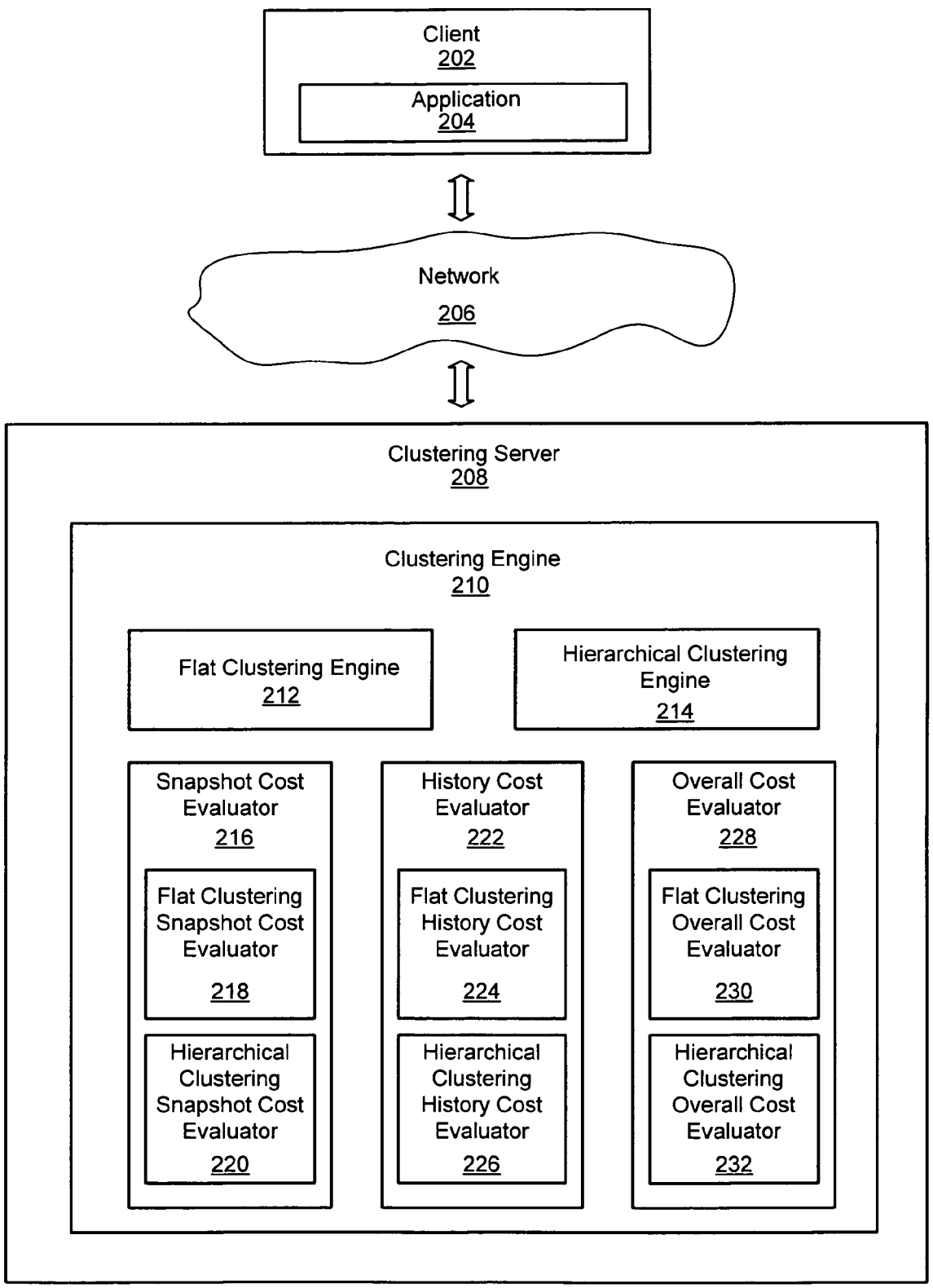
FIG. 2 is a block diagram generally representing an exemplary architecture of system components for clustering a sequential data set, in accordance with an aspect of the present invention.

Turning to FIG. 2 of the drawings, there is shown a block diagram generally representing an exemplary architecture of system components for performing evolutionary clustering of sequential data sets. Those skilled in the art will appreciate that the functionality implemented within the blocks illustrated in the diagram may be implemented as separate components or the functionality of several or all of the blocks may be implemented within a single component. For example, the functionality for the snapshot cost evaluator 216 may be included in the same component as the overall cost evaluator 228. Or the functionality of the flat clustering engine 212 may be implemented as a separate component from the clustering engine 210.

In various embodiments, a client computer 202 may be operably coupled to one or more clustering servers 208 by a network 206. The client computer 202 may be a computer such as computer system 100 of FIG. 1. The network 206 may be any type of network such as a local area network (LAN), a wide area network (WAN), or other type of network. An application 204 may execute on the client computer and may include functionality for requesting clustering of one or more data sets and/or requesting various data mining or business intelligence operations to be performed by the clustering server, such as computing cluster membership. In general, an application 204 may be any type of executable software code such as a kernel component, an application program, a linked library, an object with methods, and so forth.

A clustering server 208 may be any type of computer system or computing device such as computer system 100 of FIG. 1. The clustering server may provide services for clustering sequential data sets that may be generated periodically. A clustering server 208 may include a clustering engine 210 for generating clusters for sequential data sets. The clustering engine 210 may include a flat clustering engine 212 and/or a hierarchical clustering engine 214. The clustering engine 210 may also include a snapshot cost evaluator 216, a history cost evaluator 222, and an overall cost evaluator 228. Each of these modules may also be any type of executable software code such as a kernel component, an application program, a linked library, an object with methods, or other type of executable software code.

The clustering engine 210 may be responsible, in general, for communicating with an application 204, choosing a particular clustering engine, such as flat clustering engine 212 and/or hierarchical clustering engine 214, for performing clustering operations, and communicating with the particular clustering engine for execution of clustering operations, including clustering of sequential data sets. The flat clustering engine 212 may perform clustering using a flat clustering of points in a vector space. The hierarchical clustering manager 214 may perform clustering using hierarchical clustering. The snapshot cost evaluator 216 may determine a cost of clustering a data set independently of a series of clusterings of data sets in the sequence and may include a snapshot cost evaluator for flat clustering 218 and a snapshot cost evaluator for hierarchical clustering 220. The history cost evaluator 222 may determine a cost of clustering a data set as part of a series of clusterings of data sets in the sequence and may include a history cost evaluator for flat clustering 224 and a history cost evaluator for hierarchical clustering 226. The overall cost evaluator 228 may determine a cost of clustering a data set in the sequence of data sets by minimizing the combination of the snapshot cost of clustering the data set independently of the series of clusterings of the data sets in the sequence and the history cost of clustering the data set as part of the series of clusterings of the data sets in the sequence. The overall cost evaluator 228 may include a flat clustering overall cost evaluator 230 for flat clustering and a hierarchical clustering overall cost evaluator 232 for hierarchical clustering.

There are many applications which may use the present invention for clustering data sets collected over long periods of time. Data mining, segmentation and business intelligence applications are examples among these many applications. For any of these applications, new data may be acquired daily and may be incorporated into a clustering of data previously acquired. If the data may not deviate from historical expectations, the existing clustering, or a clustering similar to the existing one, may be used so that a user may be provided with a familiar view of the newly acquired data. However, if the structure of the data may change significantly, the clustering may eventually be modified to reflect the new structure.

For instance, consider a data set in which either of two features may be used to split the data into two clusters: feature A and feature B. Each feature may induce an orthogonal split of the data, and each split may be considered equally good. However, on odd-numbered days, feature A may provide a slightly better split, while on even-numbered days, feature B may provide a slightly better split. As a result, the optimal clustering on each day may shift radically from the previous day, while a consistent clustering using either feature may perform arbitrarily close to optimal. In such a case, a poor clustering sequence may be produced by a clustering technique that fails to consider previous clusters determined from preceding data sets. Thus, in various embodiments, the clustering method may advantageously balance the benefit of maintaining a consistent clustering over time with the cost of deviating from accurate representation of the current data.

In particular, consider $C_i$ to represent the clustering produced for the data set acquired at timestep i. As used herein, the snapshot cost of $C_i$ may mean the cost of representing the data set at timestep i using $C_i$. The history cost of the clustering may mean herein a measure of the distance between $C_i$ and $C_{i-1}$, the clustering used during the previous timestep. In various embodiments, the snapshot cost may be defined in terms of the data elements themselves, while the history cost may be a function of the cluster models. The overall cost of the clustering sequence may mean herein a combination of the snapshot cost and the history cost at each timestep.

Figure 3:
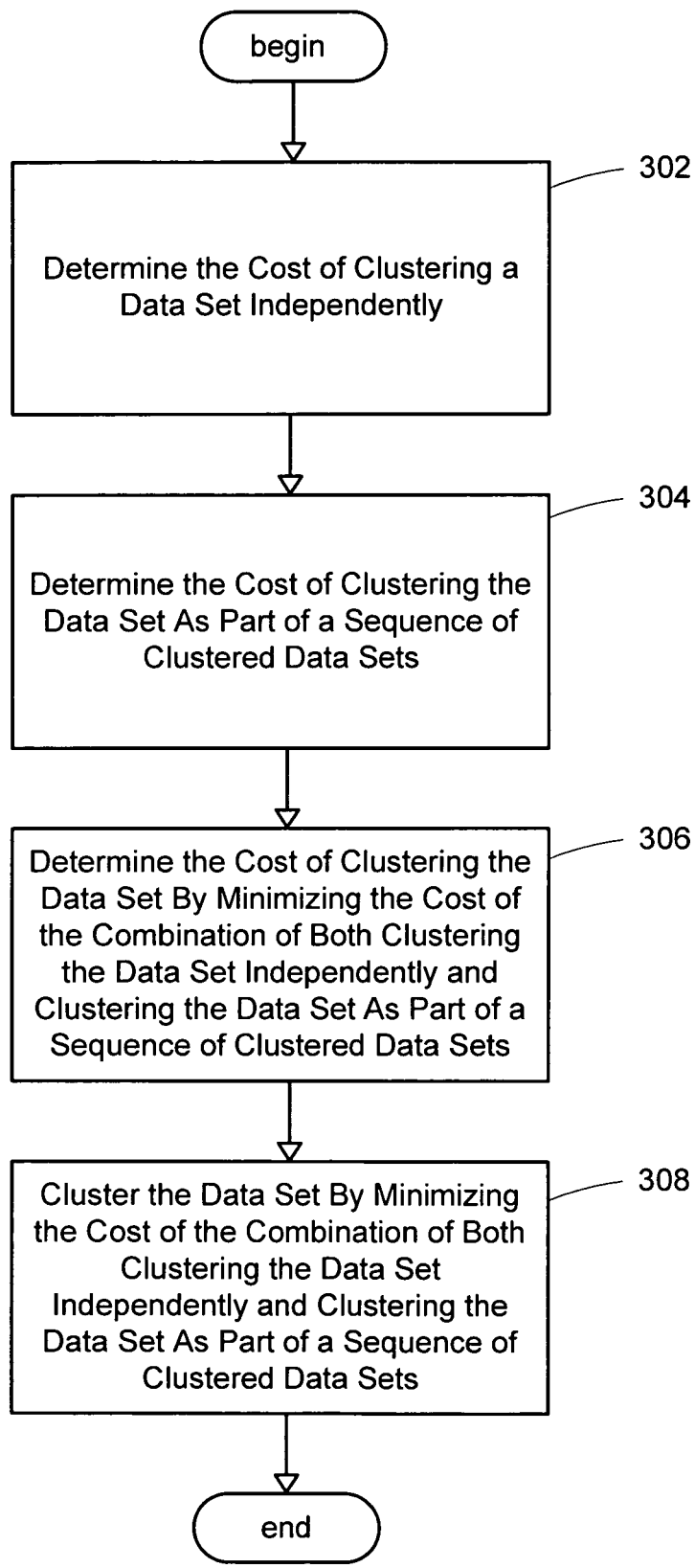
FIG. 3 is a flowchart generally representing the steps undertaken in one embodiment for evolutionary clustering of a sequential data set, in accordance with an aspect of the present invention.

FIG. 3 presents a flowchart generally representing the steps undertaken in one embodiment for evolutionary clustering of a sequential data set. In various embodiments, a sequential data set may be clustered using a flat clustering of points in a vector space. For instance, a k-means algorithm may be used in one embodiment to provide a flat clustering of points in a vector space. In various other embodiments, a sequential data set may be clustered using a hierarchical clustering. For example, a bottom-up agglomerative hierarchical clustering algorithm may be used in an embodiment. Those skilled in the art will appreciate that flat clustering and hierarchical clustering may represent just two major categories of clustering methods and that other clustering methods may likewise be supported by the generality of the framework provided.

At step 302, the cost of independently clustering a data set may be determined. The cost of independently clustering a data set may be the snapshot cost of a particular clustering method used. For example, in an embodiment where a k-means algorithm may be used to provide a flat clustering of points in a vector space, the snapshot cost may be, as is well-known in the art, the average distance from a point to its cluster center. In another embodiment where a bottom-up agglomerative hierarchical clustering algorithm may be used to provide a hierarchical clustering, the snapshot cost of the clustering may be computed as the average similarity encountered during a merge of a pair of objects belonging to the data set.

Once the cost of independently clustering a data set may be determined, the cost of clustering the data set as part of a sequence of clustered data sets may be determined at step 304. The cost of clustering the data set as part of a sequence of clustered data sets may be the history cost of a particular clustering method used. For instance, in an embodiment where a k-means algorithm may be used to provide a flat clustering of points in a vector space, the history cost may be the average distance from a cluster center to its closest equivalent during the previous clustering. In another embodiment where a bottom-up agglomerative hierarchical clustering algorithm may be used to provide a hierarchical clustering, the history cost of the clustering may be computed as the sum of squared distances over all pairs of data points between a hierarchical clustering tree of the data set and a corresponding hierarchical clustering tree of the previous data set.

After the cost of clustering the data set as part of a sequence of clustered data sets may be determined, a cost of clustering the data set may be determined at step 306 by minimizing the cost of the combination of both independently clustering the data set and clustering the data set as part of a sequence of clustered data sets. The cost of clustering the data set by minimizing the cost of the combination of both independently clustering the data set and clustering the data set as part of a sequence of clustered data sets may be the overall cost of a particular clustering method used. Next, the data set may be clustered at step 308 according to the cost determined for minimizing the cost of the combination of both independently clustering the data set and clustering the data set as part of a sequence of clustered data sets. After the data set has been clustered, processing may be finished for clustering a sequential data set.

Figure 4:
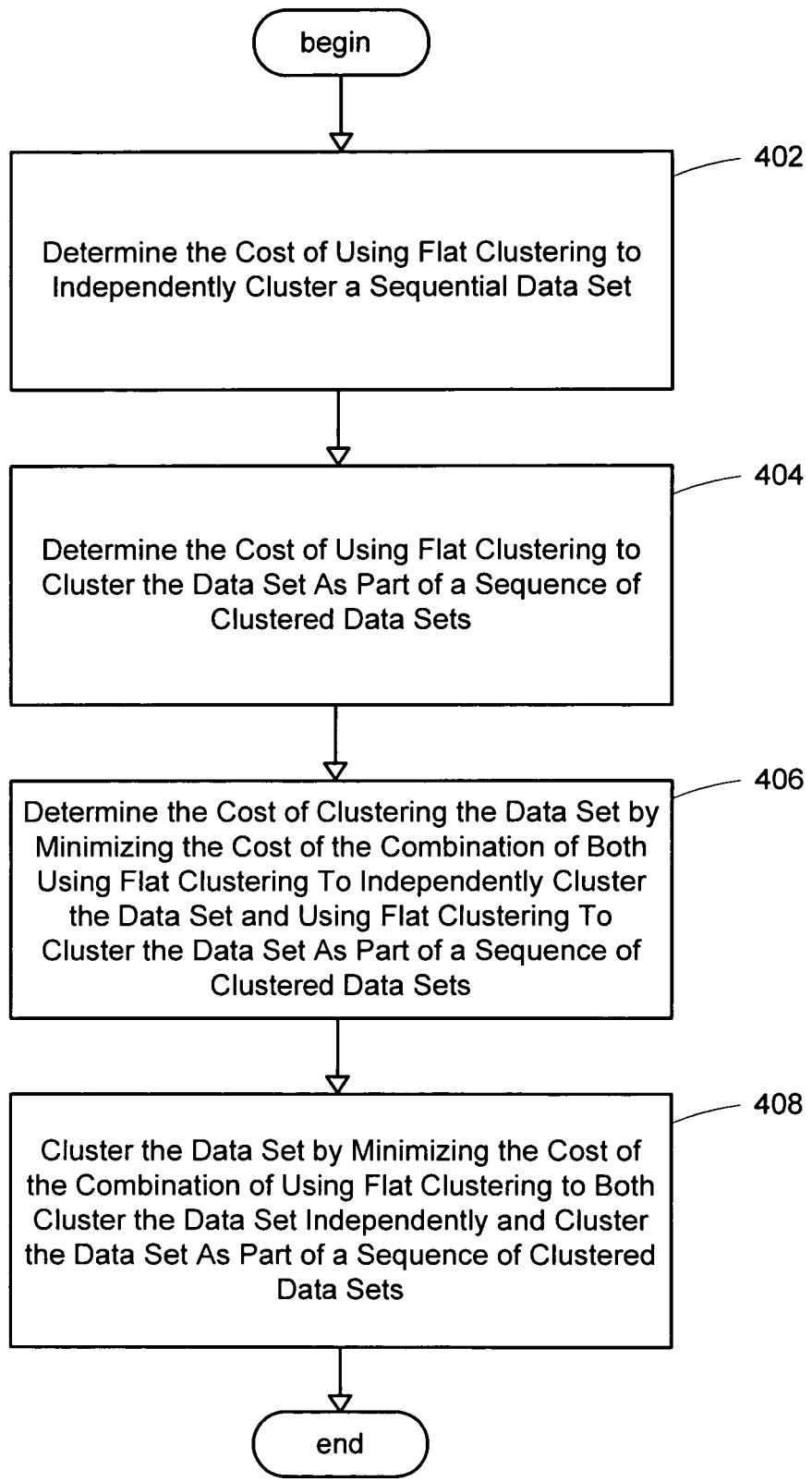
FIG. 4 is a flowchart generally representing the steps undertaken in one embodiment for evolutionary clustering of a sequential data set using flat clustering, in accordance with an aspect of the present invention.

FIG. 4 presents a flowchart generally representing the steps undertaken in one embodiment for evolutionary clustering of a sequential data set using a flat clustering of points in a vector space. At step 402, the cost of using flat clustering to independently cluster a sequential data set may be determined. For example, a k-means algorithm may be used in one embodiment to provide a flat clustering of points in a vector space. At step 404, the cost of using flat clustering to cluster the data set as part of a sequence of clustered data sets may be determined. The cost of using flat clustering to cluster the data set as part of a sequence of clustered data sets may be the history cost of a particular flat clustering method used. In an embodiment where a k-means algorithm may be used to provide a flat clustering of points in a vector space, the history cost may be the average distance from a cluster center to its closest equivalent during the previous clustering.

At step 406, a cost of using flat clustering to cluster the data set may be determined by minimizing the cost of the combination of both clustering a sequential data set independently and clustering the data set as part of a sequence of clustered data sets may be determined. At step 408, the data set may be clustered by minimizing the cost of the combination of both using flat clustering to cluster the sequential data set independently and using flat clustering to cluster the data set as part of a sequence of clustered data sets. After the data set may be so clustered, processing for evolutionary clustering of a sequential data set using a flat clustering may be finished.

Figure 5:
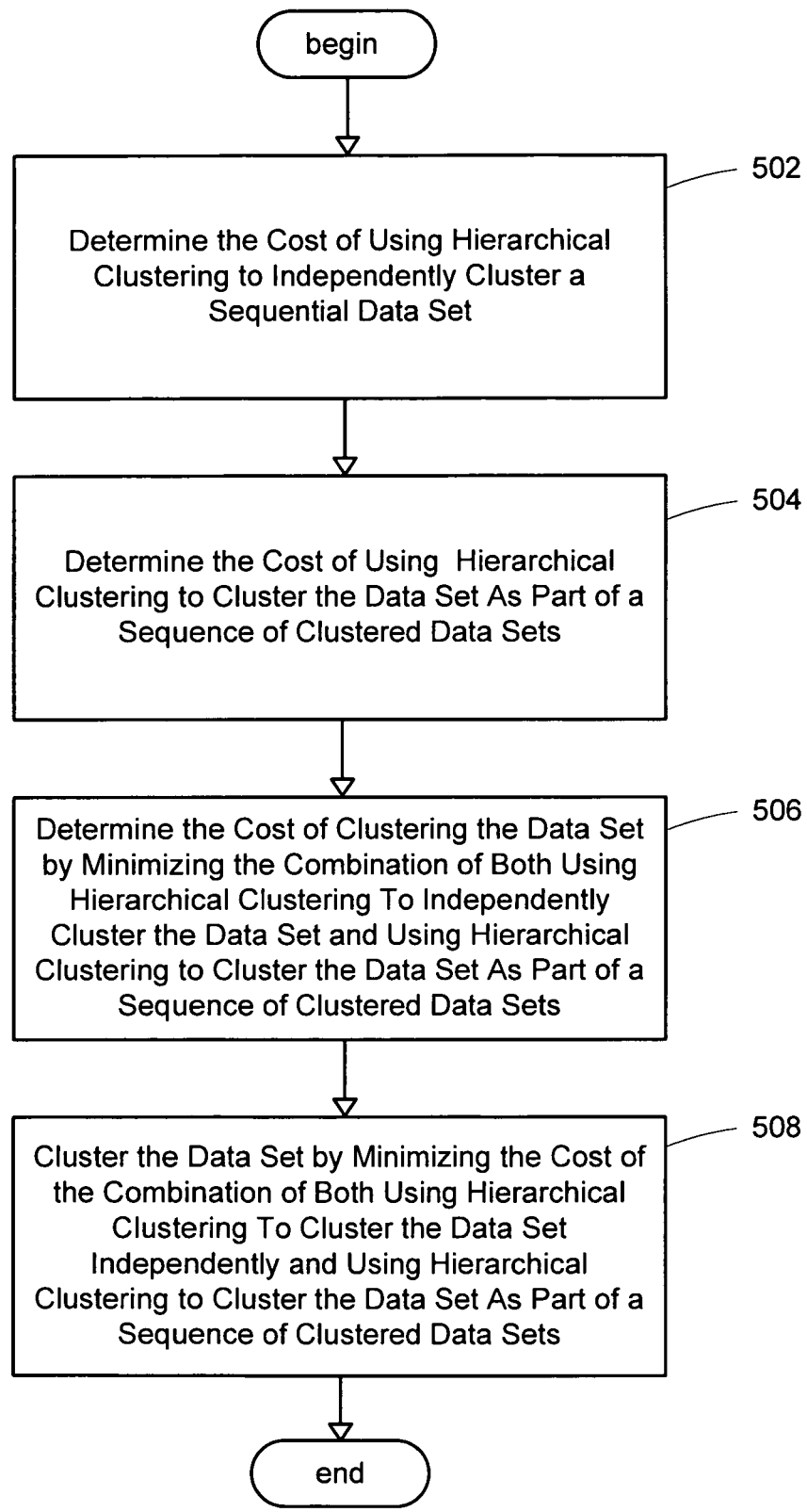
FIG. 5 is a flowchart generally representing the steps undertaken in one embodiment for evolutionary clustering of a sequential data set using hierarchical clustering, in accordance with an aspect of the present invention.

FIG. 5 presents a flowchart generally representing the steps undertaken in one embodiment for evolutionary clustering of a sequential data set using a hierarchical clustering. At step 502, the cost of using hierarchical clustering to independently clustering a sequential data set may be determined. For example, a bottom-up agglomerative hierarchical clustering algorithm may be used in one embodiment to provide a hierarchical clustering. At step 504, the cost of using hierarchical clustering to cluster the data set as part of a sequence of clustered data sets may be determined. The cost of using hierarchical clustering to cluster the data set as part of a sequence of clustered data sets may be the history cost of a particular hierarchical clustering method used. In an embodiment where a bottom-up agglomerative hierarchical clustering algorithm may be used to provide a hierarchical clustering, the history cost of the clustering may be computed as the sum of squared distances on the hierarchical clustering tree between all pairs of data points.

At step 506, a cost of clustering the data set may be determined by minimizing the cost of the combination of both using hierarchical clustering to independently cluster a sequential data set and using hierarchical clustering to cluster the data set as part of a sequence of clustered data sets. At step 508, the data set may be clustered by minimizing the cost of the combination of both using hierarchical clustering to independently cluster a sequential data set and using hierarchical clustering to cluster the data set as part of a sequence of clustered data sets. Upon clustering the data set by minimizing the cost of the combination of both using hierarchical clustering to independently cluster a sequential data set and using hierarchical clustering to cluster the data set as part of a sequence of clustered data sets, processing for evolutionary clustering of a sequential data set using a hierarchical clustering may be finished.

Figure 6:
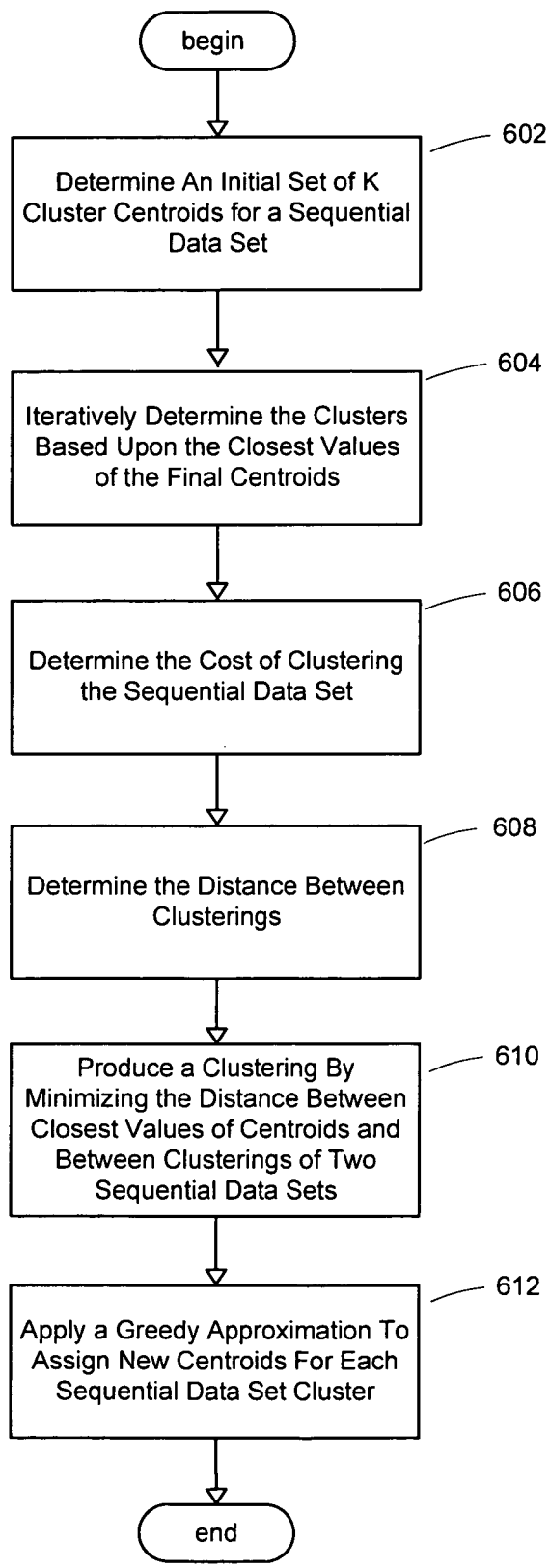
FIG. 6 is a flowchart generally representing the steps undertaken in one embodiment for evolutionary clustering of a sequential data set using a k-means clustering algorithm, in accordance with an aspect of the present invention.

FIG. 6 presents a flowchart generally representing the steps undertaken in one embodiment for evolutionary clustering of a sequential data set using a k-means clustering algorithm to provide a flat clustering of points in a vector space. At step 602, an initial set of k cluster centroids may be determined. For instance, consider that each point of the data set may be represented as $x_{i,t}$ and may lie in Euclidean space $R^l$. The clustering algorithm may begin with a set of k cluster centroids, $c_1, \ldots, C_k$, with $C_i \in R^l$. Consider Closest(j,t) to be defined as the set of all points assigned to centroid $c_j$ at time t such that:

$$\text{Closest}(j, t) = \left\{ x_{i,t} \mid j = \arg\min_x d(c_x, x_{i,t}) \right\}.$$

In an embodiment, a version of k-means known in the art as spherical k-means may be used, where the distance between two points may be defined as the Euclidean distance after projecting them on to a unit sphere. Spherical k-means may be especially suitable for clustering a high-dimensional data set, such as in 5,000 dimensions.

At step 604, the clusters may be iteratively determined based upon the closest values of the final centroids. To do so, consider the timestep t to be fixed. The algorithm may then proceed in several passes, during each of which it may update each centroid based on the data elements currently assigned to that centroid such that:

$$c_j \leftarrow |\text{Closest}(j)|^{-1} \sum_{x \in \text{Closest}(j)} x.$$

After sufficient passes, the clusters may be determined based on the Closest values of the final centroids and the algorithm may terminate.

Next, the cost of clustering the sequential data set may be determined at step 606. Considering that a clustering $C^t = \{c^t_1, \ldots, C^t_k\}$ may be a set of k centroids in $R_l$, and U(t+1) may represent all the data points seen till timestep t+1, the cost of a k-means clustering or snapshot cost may be defined such that:

$$\text{quality}(C^{t+1}) = \sum_{x \in U(t+1)} \min_{c \in C^{t+1}} d(c, x).$$

At step 608, the distance between clusterings may be determined. In an embodiment, the distance may be determined between corresponding clusters of the previous clustering and the k-means clustering. Considering that a clustering $C^t = \{c^t_1, \ldots, c^t_k\}$ may be a set of k centroids in $R^l$, the distance between clusterings, or the history cost, may be defined as follows:

$$d_{cen}(C^t, C^{t+1}) = \min_{f|[k] \mapsto [k]} d(c_i^{t+1}, c_{f(i)}^t),$$

where f is a function mapping centroids of $C^{t+1}$ to centroids of $C^t$. That is, the distance between two clusterings may be computed by matching each centroid in $C^{t+1}$ to a centroid in $C^t$, and then adding the distances from each centroid to its match.

Next a clustering may be produced at step 610 that may minimize the distance between Closest values of centroids and between clusterings of two sequential data sets. Considering that a clustering $C^t = \{c^t_1, \ldots, C^t_k\}$ may be a set of k centroids in $R^l$, the distance between clusterings, or the overall cost, may be defined such that:

TotQual($C^{t+1}$)=$d_{cen}(C^t, C^{t+1})$+δ·quality($C^{t+1}$),  where  δ may be a normalizing constant. In an embodiment, δ may be set to 1.

At step 612, a greedy approximation may be applied to assign new centroids for each sequential data set cluster. To do so, new centroids may be assigned at each timestep using both the data during a particular timestep and the previous centroids. For example, given a set of initial centroids drawn from $C^t$ at timestep t+1, consider $c_\alpha{}^t$ to be the closest centroid of $C^t$ for each centroid $c_j^{t+1}$. During each pass of the algorithm beginning at timestep t+1, $c^{t+1}_j$ may be updated as follows:

$$c_j^{t+1} = \varepsilon c_\alpha^t + (1 - \varepsilon)|\text{Closest}(j)|^{-1} \sum_{x \in \text{Closest}(j)} x.$$

After a clustering sequence may be produced, processing may be finished for evolutionary clustering of a sequential data set using a k-means algorithm.

Figure 7:
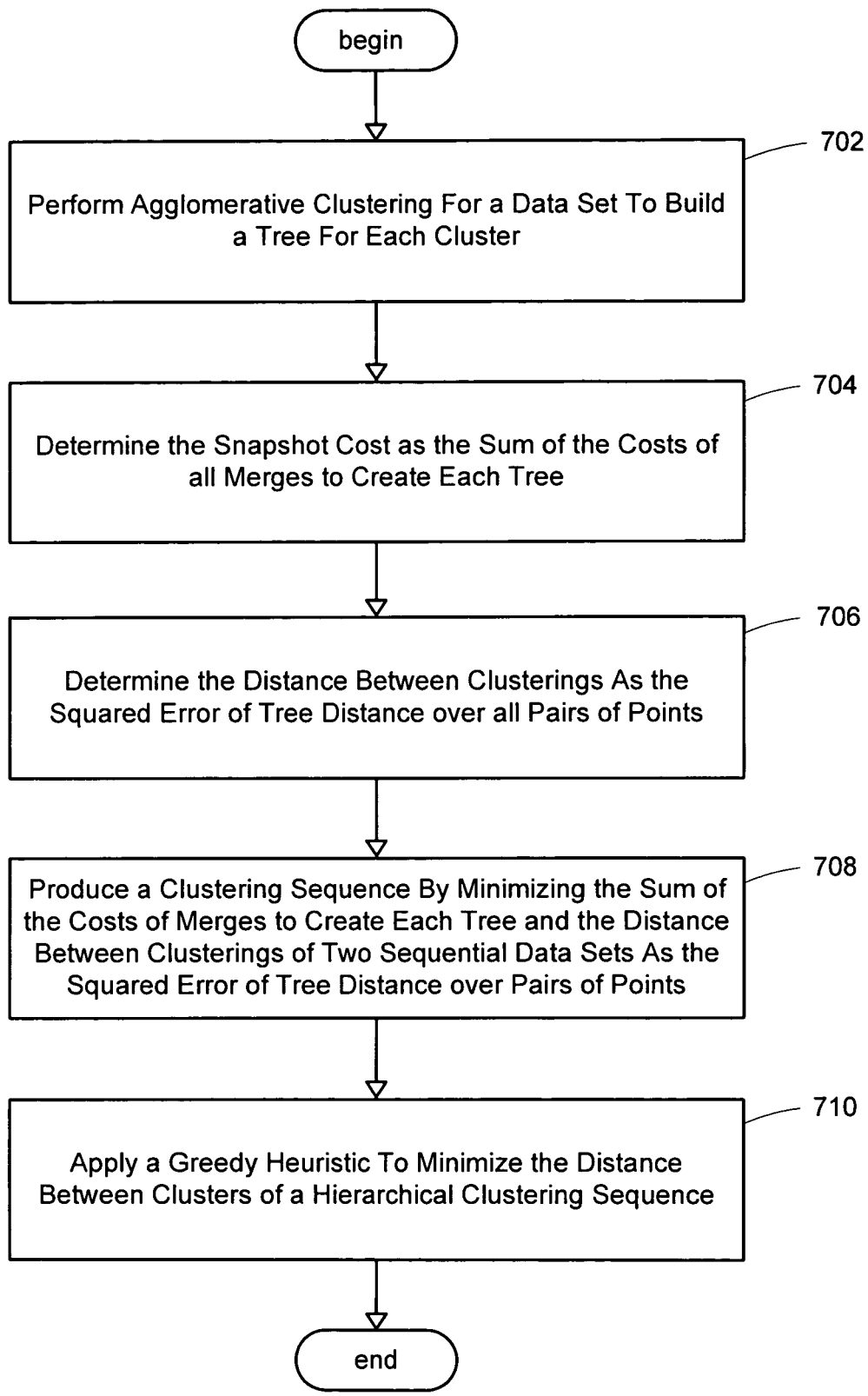
FIG. 7 is a flowchart generally representing the steps undertaken in one embodiment for evolutionary clustering of a sequential data set using a bottom-up agglomerative hierarchical clustering algorithm, in accordance with an aspect of the present invention.

FIG. 7 presents a flowchart generally representing the steps undertaken in one embodiment for evolutionary clustering of a sequential data set using a bottom-up agglomerative hierarchical clustering algorithm. At step 702, agglomerative clustering for a data set may be performed to build a tree for each cluster. To do so, consider that U={1, . . . , n} may represent the universe of objects to be clustered. At each timestep 1, . . . , T, a new data set may arrive to be clustered. This data may be expressed as an n×n matrix representing the relationship between each pair of data objects, either based on similarity or based on distance depending on the requirements of the particular underlying clustering algorithm. For a clustering algorithm that may require similarities, Sim(i, j, t) may represent the similarity between objects i and j at time t. Likewise, for a clustering algorithm that may require distances, d(i, j, t) may represent the distance between i and j at time t. Thus, at each timestep, an evolutionary clustering algorithm may be presented with a new matrix, either Sim(·, ·, t) or d(·, ·, t), and may produce $C_t$, the clustering for time t, based on the new matrix and the history so far.

In one embodiment to perform bottom-up agglomerative clustering, a pair i, j may be selected that may maximize Sim(i, j, t), as defined above. The similarity matrix may then be updated by removing the rows and columns for objects i and j, and replacing them with a new row and column that represent their merge. The procedure may be repeated to incrementally build a binary tree, T, whose leaves are 1, . . . , n, in a bottom-up fashion. In this way, a binary tree T representing a cluster of the data set may be constructed as the result of performing a series of pairwise merges, though not necessarily optimally at each step.

At step 704, the snapshot cost may be determined as the sum of the cost of all merges to create a tree. Consider the internal nodes of T to be labeled $m_1, \ldots, m_{n-1}$, and consider $s(m_i)$ to represent the similarity score of the merge that produced internal node $m_i$. Also, consider in (T) to be the set of all internal nodes of T. Then the total clustering quality of T, or snapshot cost, may be the sum of the costs of all merges performed to create T, defined as follows:

$$\text{quality}(T) = \sum_{m \in in(T)} s(m).$$

At step 706, the distance between clusterings may be determined as the squared error of tree distance over all pairs of points. In order to compare two clusterings by defining a metric over their respective trees, consider $T_1$ and $T_2$ to be trees whose leaves are $1, \ldots, n$, and consider $d_{T_1}(i, j)$ to be the tree distance in $T_1$ between leaves i and j. The error of tags i and j with respect to trees $T_1$ and $T_2$ may be defined as $$err^{(T_1, T_2)}(i,j) = [d_{T_1}(i,j) - d_{T_2}(i,j)]^2.$$

Then the distance between trees $T_1$ and $T_2$, or the history cost, may be simply defined as the squared error in tree distance over all pairs of points:

$$d_{tree}(T_1, T_2) = \binom{n}{2}^{-1} \sum_{\substack{i,j \in [n] \\ i \neq j}} err^{(T_1, T_2)}(i, j).$$

At step 708, a clustering sequence may then be produced by minimizing both the sum of the costs of all mergers to create each tree and the distance between clusterings of two sequential data sets determined as the squared error of the tree distance over all pairs of points. More particularly, consider $T_t$ to be the clustering given by the algorithm at time t. The quality of a tree $T_{t+1}$ at time t+1 may be defined to be:

$\text{TotQual}(T_{t+1}) = \gamma \cdot \text{quality}(T_{t+1}) - d_{tree}(T_t, T_{t+1})$, where $\gamma$ may be a normalizing constant. In an embodiment, $\gamma$ may be set to $(|m|)^{-1}$. A clustering $T_{t+1}$ may be determined that may minimize this expression defining the quality of a tree at time t+1 by taking into account both the previous clustering $T_t$, and the similarity matrix defining the data at time t+1. Notice that this may not be the optimal online decision at time t+1, but without knowing the future, it is at least a reasonable measure to optimize. More generally, a clustering sequence $T_1, \ldots, T_T$ may be produced over all timesteps that may maximize the following:

$$\gamma \sum_{i=1}^{T} \text{quality}(T_i) - \sum_{i=1}^{T-1} d_{tree}(T_i, T_{i+1}).$$

Using this measure of the overall quality of a particular hierarchical clustering sequence, a set of greedy heuristics may then be described to approximately optimize this measure. At step 710, a greedy heuristic may then be applied to minimize the distance between clusters of a hierarchical clustering sequence. The heuristics may operate by processing the data timestep by timestep, producing $T_{t+1}$ based on the clustering $T_t$, and greedily merging using a measure that includes both snapshot and historical information.

The measure may be a linear combination of a snapshot cost and a history cost. The snapshot cost may be the standalone merge quality used by the non-evolutionary agglomerative clustering. The history cost may be a measure of the historical cost being introduced (or saved) by a particular merge. $T_{t+1}$ may be greedily generated by agglomeratively selecting merges that maximize this overall heuristic cost.

The measure being optimized, $\gamma \cdot \text{quality}(T_{t+1}) - \text{dtree}(T_t, T_{t+1})$, may be rewritten as follows. For an internal node m of the clustering tree being produced at time t+1, consider $m_l$ and $m_r$ to be the leaves of the left and right subtrees of m respectively. Then the distance between $T_t$ and $T_{t+1}$ may be written as a sum of contributions from each internal node, where the contribution covers all pairs of points for which that internal node is the least common ancestor:

$$d_{tree}(T_t, T_{t+1}) = \binom{n}{2}^{-1} \sum_{m \in in(T_{t+1})} \sum_{\substack{i \in m_l \\ j \in m_r}} err^{(T_1, T_2)}(i, j).$$

Using this reformulation of history cost, the overall quality, incorporating both snapshot and history, may be written as a sum over merges:

$$\text{TotQual}(T) = \sum_{m \in in(T)} \left( \gamma s(m) - \binom{n}{2}^{-1} \sum_{\substack{i \in m_l \\ j \in m_r}} err^{(T_1, T_2)}(i, j) \right).$$

Furthermore, a natural greedy heuristic may be applied by choosing the merge whose contribution to this sum may be optimal. In an embodiment that may avoid a bias towards larger trees, the overall quality may be modified to pick the merge that maximizes the following:

$$\text{benefit}(m) = \gamma s(m) - \frac{\sum_{i \in m_l, j \in m_r} err^{(T_1, T_2)}(i, j)}{|m_l| \cdot |m_r|}.$$

This heuristic may be defined herein as Squared, since it greedily minimizes the squared error.

However, a merge with a particular squared error may become better or worse if it is put off until later. For example, if two objects are far away in $T_t$, then perhaps the merge may be delayed until they are similarly far away in $T_{t+1}$. On the other hand, if two objects are close in $T_t$ but merging them would already make them far in $T_{t+1}$, then the merge may be encouraged despite their high cost, as delaying may only make things worse. Based on this observation, the cost of merging may be evaluated by considering what may change if the merge may be delayed until the two merged subtrees became more distant from one another (due to intermediate merges).

More particularly, consider a possible merge of subtrees $S_1$ and $S_2$. Performing a merge may incur a penalty for nodes that may be still too close, and a benefit for nodes that may already be too far apart. Such a benefit and penalty may be expressed in terms of the change in cost if either $S_1$ or $S_2$ participates in another merge, and hence the elements of $S_1$ and $S_2$ increase their average distance by 1. In an embodiment, this penalty may be written by taking the partial derivative of the squared cost with respect to the distance of an element to the root. At any point in the execution of the algorithm at time t+1, consider root(i) be the root of the current subtree containing i. For i∈S1 and j∈S2, consider that $d^M(i, j)=d(i,\text{root}(i))+d(j,\text{root}(j))+2$ be the merge distance of i and j at time t+1; that is, $d^M(i, j)$ may be the distance between i and j at t+1 if $S_1$ and $S_2$ may be merged together. Then the benefit of merging now is given by:

$$\text{benefit}(m) = \gamma s(m) - \frac{\sum_{i \in m_l, j \in m_r}(d_{T_t}(i, j) - d^M(i, j))}{|m_l| \cdot |m_r|}.$$

Notice that, as desired, the benefit may be positive when the distance in $T_t$ may be large, and negative otherwise. Similarly, the magnitude of the penalty depends on the derivative of the squared error. As used herein, this heuristic that may choose the merge m that maximizes this benefit may be defined as Linear-Internal. In practice, the Linear-Internal heuristic may work well for incorporating history information in a series of clusterings of sequential data sets.

In another embodiment, consider that a decision about merging $S_1$ and $S_2$ may also depend on objects that do not belong to either subtree. For example, assume that elements of $S_1$ may be already too far apart from some subtree $S_3$. Then merging $S_1$ with $S_2$ may introduce additional costs downstream that may not be apparent without looking outside the potential merge set. In order to address this problem, the previous Linear-Internal benefit function may be modified to penalize a merge if it may increase the distance gap (that is, the distance at time t+1 versus the distance at time t) between elements that may participate in the merge and elements that may not. Similarly, a benefit may be given to a merge if it may decrease the distance gap between elements in the merge and elements not in the merge. The joint formulation may be defined as follows:

$$\text{benefit}(m) = \gamma s(m) - \eta \sum_{\substack{i \in m_l, \\ j \in m_r}}(d_{T_t}(i, j) - d^M(i, j)) + \eta \sum_{\substack{i \in m, \\ j \notin m}}(d_{T_t}(i, j) - d^M(i, j)),$$

where $\eta = 1/(|m_l| \cdot |m_r| + |m| \cdot |U \setminus m|)$. As used herein, this joint formulation may be defined as Linear-Both because it considers the internal cost of merging elements i∈S1 and j∈S2, and the external cost of merging elements i∈S1∪S2 and j∉S1∪S2. In practice, the Linear-Both heuristic may work well for providing an accurate snapshot for clustering each particular data set in a series of clusterings of sequential data sets.

In yet another embodiment, a formulation of a heuristic that considers the external cost alone may be defined herein as follows:

$$\text{benefit}(m) = \gamma s(m) + \frac{\sum_{i \in m, j \notin m}(d_{T_t}(i, j) - d^M(i, j))}{|m| \cdot |U \setminus m|}.$$

In this way, a set of greedy heuristics may be applied to minimize the distance between clusters of a hierarchical clustering sequence by processing the data timestep by timestep, producing $T_{t+1}$ based on the clustering $T_t$, and greedily merging using a measure that includes both snapshot and historical information. After a clustering sequence may be produced, processing may be finished for evolutionary clustering of a sequential data set using a bottom-up agglomerative hierarchical algorithm.

Thus the present invention may flexibly provide a series of clusterings from a sequence of data sets that may simultaneously attain both high accuracy in clustering an individual data set and high fidelity in providing a series of clusterings from the sequence of data sets. By accurately clustering data at each timestep and without dramatic shifts in clusterings from one timestep to the next, the present invention may provide a sequence of clusterings that may change smoothly over time to allow ease of interpretation and use of the data clustered. The evolutionary clustering provided by the present invention may additionally act as a denoising filter which provides a better quality clustering than a potentially noisy approximation provided by independently clustering the data set without the benefit of including a history cost.

As can be seen from the foregoing detailed description, the present invention provides an improved system and method for evolutionary clustering of sequential data sets. By generalizing the use of an overall cost that includes both a snapshot cost and a history cost to provide clustering of a sequential data set, the present invention provides a novel framework for evolutionary clustering. Any number of clustering algorithms may be supported by the generic framework provided, including flat clustering algorithms and hierarchical clustering algorithms. Other static clustering algorithms can also be extended to perform evolutionary clustering under this framework. Such a system and method support clustering detailed data sets needed by data mining, segmentation and business intelligence applications collected over various periods of time. As a result, the system and method provide significant advantages and benefits needed in contemporary computing, and more particularly in data mining and business intelligence applications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer system for clustering a data set in a sequence of data sets, comprising:
   a processor device performing computer-executable instructions comprising:
   receiving a data set as part of a sequence of data sets in a series of clusterings, said data set having a plurality of data elements and each of the data sets in the sequence being acquired at different timesteps;
   determining a first cost of clustering the data set;
   wherein the first cost comprises a cost of clustering the data set independently of the series of clusterings of the data sets in the sequence, each of the data sets being acquired at different timesteps;
   determining a second cost of clustering the data set;
   wherein the second cost comprises a cost of clustering the data set as part of the series of clusterings of the data sets in the sequence;
   combining the first cost with the second cost at each timestep;
   determining an overall cost of clustering the data set as a sum of the first cost and the second cost, using a selected clustering method;
   minimizing the overall cost; and clustering the data set using the selected clustering method according to the minimized overall cost, such that the clustering at any time has high accuracy while also ensuring that said clustering does not change dramatically from one timestep to a next timestep.

2. The system of claim 1 wherein clustering the data set comprises using a flat clustering of points in a vector space.

3. The system of claim 1 wherein clustering the data set comprises using hierarchical clustering.

4. The system of claim 2 wherein determining the first cost comprises determining a cost using flat clustering to cluster the data set independently of the series of clusterings of the data sets in the sequence.

5. The system of claim 2 wherein determining the second cost comprises determining a cost of using flat clustering to cluster the data set as part of the series of clusterings of the data sets in the sequence.

6. The system of claim 3 wherein determining the first cost comprises determining a cost of using hierarchical clustering to cluster the data set independently of the series of clusterings of the data sets in the sequence.

7. The system of claim 3 wherein determining the second cost comprises determining a cost using hierarchical clustering to cluster the data set as part of the series of clusterings of the data sets in the sequence.

8. The system of claim 1 wherein determining the overall cost comprises determining a cost of clustering the data set by minimizing both the first cost of using flat clustering to cluster the data set independently of the series of clusterings of the data sets in the sequence and the second cost of using flat clustering to cluster the data set as part of the series of clusterings of the data sets in the sequence.

9. The system of claim 1 wherein determining the overall cost comprises determining a cost of clustering the data set using hierarchical clustering to cluster the data set.

10. A computer-implemented method for clustering a data set, comprising:
  determining a first cost of clustering a data set;
  wherein the first cost comprises a cost of clustering the data set in a sequence of data sets independently of a series of clusterings of the data sets in the sequence, the data set having a plurality of data elements and each of the data sets in the sequence of data sets being acquired at different timesteps;
  determining a second cost of clustering the data set;
  wherein the second cost comprises a cost of clustering the data set as part of the sequence of clustered data sets;
  combining the first cost with the second cost at each timestep;
  determining an overall cost of clustering the data set in the sequence of data sets as a sum of the first cost and the second cost, using a selected clustering method;
  minimizing the overall cost; and
  clustering the sequence of data sets using the selected clustering method according to the minimized overall cost, such that the clustering at any time has high accuracy while also ensuring that said clustering does not change dramatically from one timestep to a next timestep.

11. The method of claim 10 wherein providing the optimal clustering sequence further comprises applying a greedy heuristic algorithm to minimize a distance between corresponding clusters of the data set and a previous data set in the sequence of data sets.

12. The method of claim 10 wherein determining the first cost of clustering the data set comprises determining a cost of representing the data set for the clustering method used.

13. The method of claim 10 wherein determining the second cost of clustering the data set comprises determining a measure of a distance between corresponding clusters of the data set and a previous data set in the sequence of data sets.

14. The method of claim 10 wherein determining the overall cost of clustering the data set further comprises minimizing a combination of a cost of representing the data set for a particular clustering method used and a measure of a distance between corresponding clusters of the data set and a previous data set in the sequence of data sets.

15. A computer-readable storage medium having computer-executable instructions for performing the method of claim 10.

* * * * *